(12) United States Patent
Kerth et al.

(10) Patent No.: US 7,653,356 B2
(45) Date of Patent: Jan. 26, 2010

(54) SYSTEM AND METHOD FOR REDUCING SPURIOUS EMISSIONS IN A WIRELESS COMMUNICATION DEVICE INCLUDING A TESTING APPARATUS

(75) Inventors: Donald A. Kerth, Austin, TX (US); James Maligeorgos, Austin, TX (US); Xiaochuan Guo, Austin, TX (US); Augusto Manuel Marques, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 626 days.

(21) Appl. No.: 11/341,149

(22) Filed: Jan. 27, 2006

(65) Prior Publication Data
US 2007/0060069 A1 Mar. 15, 2007

Related U.S. Application Data

(63) Continuation-in-part of application No. 11/264,631, filed on Nov. 1, 2005, now abandoned.

(60) Provisional application No. 60/717,295, filed on Sep. 15, 2005.

(51) Int. Cl.
*H04B 17/00* (2006.01)
(52) U.S. Cl. .................. 455/67.14; 455/67.13; 455/69; 455/260; 455/423; 455/424; 331/16; 331/40; 331/50; 331/185; 327/551; 327/156; 327/159; 324/158.1; 324/754
(58) Field of Classification Search .............. 455/67.14, 455/67.13, 69, 260, 423, 424; 327/156, 159; 324/158.1, 754
See application file for complete search history.

(56) References Cited

U.S. PATENT DOCUMENTS

| 6,041,087 | A | 3/2000 | Inamori |
| 6,272,191 | B1 | 8/2001 | Inamori |
| 6,278,485 | B1 * | 8/2001 | Franchville et al. .......... 348/192 |
| 6,771,087 | B1 * | 8/2004 | Oz et al. ...................... 324/763 |
| 6,885,209 | B2 * | 4/2005 | Mak et al. .................... 324/763 |
| 7,082,293 | B1 * | 7/2006 | Rofougaran et al. ......... 455/260 |
| 7,154,259 | B2 * | 12/2006 | Miller ....................... 324/158.1 |
| 7,199,650 | B1 * | 4/2007 | Welland et al. .............. 327/551 |
| 7,292,091 | B1 * | 11/2007 | Welland et al. .............. 327/551 |

(Continued)

OTHER PUBLICATIONS

Abidi, "RF CMOS Comes of Age", IEEE Microwave Magazine, Dec. 2004.

(Continued)

*Primary Examiner*—Marceau Milord
(74) *Attorney, Agent, or Firm*—Mark P Kahler

(57) ABSTRACT

A wireless communication device is disclosed wherein isolation buffers couple to respective active circuits or stages of the device to convey test information regarding such active circuits to a test data line from which status information may be collected. The communication device operates in two modes, namely a normal operational mode wherein the isolation buffers effectively short spurious emissions from the active circuits to a ground, and a test mode wherein the isolation buffers may convey test information from a selected active circuit to the test data line. The isolation buffers prevent spurious emissions from escaping the active circuits to which they are coupled and prevent spurious emissions from traveling from active circuit to active circuit over the test data line throughout the wireless device.

9 Claims, 5 Drawing Sheets

U.S. PATENT DOCUMENTS

| | | | | |
|---|---|---|---|---|
| 7,313,178 | B2* | 12/2007 | Iadanza | 375/224 |
| 7,323,945 | B2* | 1/2008 | Cyr et al. | 331/16 |
| 7,453,258 | B2* | 11/2008 | Miller | 324/158.1 |
| 7,463,868 | B2* | 12/2008 | Rofougaran et al. | 455/118 |
| 7,482,887 | B2* | 1/2009 | Cyr et al. | 331/108 C |
| 2005/0088167 | A1 | 4/2005 | Miller | |

OTHER PUBLICATIONS

Agilent, Semiconductor Wireless Applications and Selection Guides, Agilent Technologies, Jun. 24, 2005.

Agilent, "Agilent MGA-565P8 Buffer Amplifier for 150 MHz Application", Agilent Application Note 5038, Nov. 1, 2004.

Agilent, "Agilent MGA-565P8 High Isolation Buffer Amplifier", Agilent Reliability Data Sheet, Sep. 29, 2003.

Agilent, "Application Info. for the MGA-565P8 High Isolation E-PHEMT Buffer Amplifier", Agilent Application Note 1361, Jun. 12, 2003.

Agilent, "Agilent MGA-565P8 20 dBm Psat High Isolation Buffer Amplifier", Agilent Data Sheet, Aug. 3, 2005.

Agilent, "A High Isolation Buffer Amplifier Using Enhancement Mode PHEMT Technology", Agilent White Paper, Jul. 3, 2003.

Crols-Steyaert, "Low-IF Topologies for High Performance Analog Front Ends of Fully Integrated Receivers", IEEE Transactions on Circuits and Systems-II, Mar. 1998.

Maxim, "+14dBm to +20dBm LO Buffers with +/− 1dB Varation", Maxim Data Sheet for MAX9989 / MAX 9990, Jul. 2002.

Maxim, "500MHz to 2500MHz VCO Buffer Amplifiers", Maxim Data Sheet for MAX2472 / MAX2473, Jun. 1999.

Maxim, "Maxim Solutions for 3.5 GHz Wireless Local Loop", downloaded from http://www.maxim-ic.com/images/appnotes/806/WA21Fig01.pdf on Aug. 23, 2005.

Maxim, "Simplifying Tomorrow's LO Drive Designs with the MAX9987-90 Family of LO Buffers/Splitters", Maxim, Mar. 2003.

St Micro, "STB7101 0.9/1.9GHz Broad Band Pre-Power Amplifier", St Micro, Jan. 22, 2002.

* cited by examiner

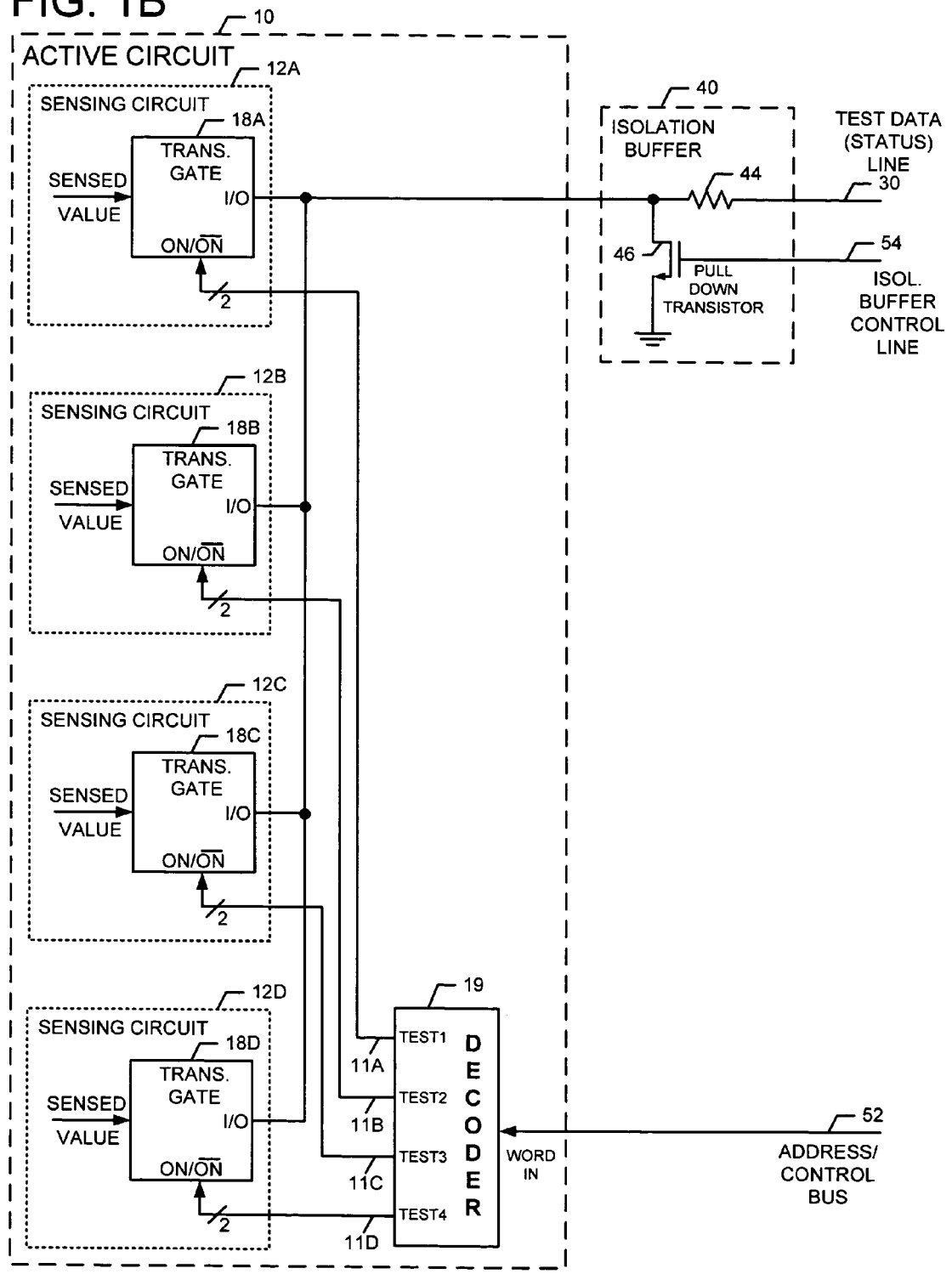

SYSTEM AND METHOD FOR REDUCING SPURIOUS EMISSIONS IN A WIRELESS COMMUNICATION DEVICE INCLUDING A TESTING APPARATUS

RELATED PATENT APPLICATIONS

This patent application is a continuation-in-part of, and claims priority to, the U.S. Patent Application entitled "SYSTEM AND METHOD FOR REDUCING SPURIOUS EMISSIONS IN A WIRELESS COMMUNICATION DEVICE INCLUDING A TESTING APPARATUS" by inventors Kerth, et al., Ser. No. 11/264,631, filed Nov. 1, 2005, now abandoned and claims the benefit of Provisional U.S. Patent Application Ser. No. 60/717,295, filed Sep. 15, 2005, that is assigned to the same Assignee as the subject patent application, both of which are incorporated herein by reference in their entirety.

This patent application relates to U.S. patent application Ser. No. 09/686,072, filed Oct. 11, 2000, by Welland et al., entitled "Method and Apparatus for Reducing Interference", which is incorporated herein by reference in its entirety.

TECHNICAL FIELD OF THE INVENTION

The disclosures herein relate generally to wireless communication systems, and more particularly, to reducing and containing spurious radio frequency signals generated by wireless communication systems.

BACKGROUND

Modern wireless communication devices include several blocks or stages that cooperate to achieve a desired functionality. For example, a wireless communication device may include a receiver section having blocks such as an antenna interface, low noise amplifier, mixer, analog to digital converters, a digital signal processor and baseband circuitry coupled thereto. The communication device may also include a transmitter section with several stages or blocks that process a baseband signal for transmission as a radio frequency signal at a desired frequency. A frequency synthesizer may couple to both the receiver section and the transmitter section to control the respective receive and transmit frequencies thereof. The synthesizer itself may include several blocks or stages such as a reference signal oscillator, phase detector, charge pump, low pass filter, voltage controlled oscillator (VCO) and various divider circuits all coupled together according to standard practice in the industry.

It is desirable to be able to monitor the performance of each of the blocks forming a communication device during both the design phase of the communication device and when manufacturing the communication device in the factory. Unfortunately, testing each stage of a communication system can be challenging. When testing the stages of a communication device, it is important that any test apparatus in the communication device not allow spurious radio frequency signals to escape from the device during normal system operation. Moreover, it is desirable that the test apparatus not introduce undesired coupling of spurious radiation between the stages of the communication device. Such coupling could degrade communication device performance and compromise test results.

What is needed is a wireless communication device including an improved test apparatus which addresses the problems discussed above.

SUMMARY

Accordingly, in one embodiment, a method is disclosed for operating a wireless communication device including a plurality of active circuits. The method includes operating the device in a first mode wherein an isolation buffer coupled between an active circuit and a test data line attenuates spurious emissions from the active circuit. A sensing circuit in the active circuit presents a high impedance state to the isolation buffer when the device is in the first mode. The method also includes operating the device in a second mode wherein the sensing circuit provides a test signal to the isolation buffer and the isolation buffer provides the test signal to the test data line. Spurious emissions are substantially prevented from escaping from the active circuits and from undesirably traveling from active circuit to active circuit over the test data line.

In another embodiment, a wireless communication device is disclosed that includes a plurality of active circuits including a first active circuit. The first active circuit includes a first sensing circuit that senses an operational parameter of the first active circuit. The device also includes a test data line. The device further includes a first isolation buffer coupling the first sensing circuit to the test data line. The device still further includes a controller, coupled to the first active circuit, that instructs the device to enter a first mode wherein the isolation buffer attenuates spurious emissions from the first active circuit and the first sensing circuit presents a high impedance to the isolation buffer. The controller may also instruct the device to enter a second mode in which the first sensing circuit provides a test signal to the first isolation buffer and the first isolation buffer provides the test signal to the test data line.

In yet another embodiment, a wireless communication device is disclosed that includes a plurality of active circuits. Each active circuit includes a plurality of sensing circuits, each sensing circuit being selectable to provide test information relating to the active circuit in which it is included. The wireless communication device also includes a test data line and a plurality of isolation buffers coupling the plurality of sensing circuits, respectively, to the test data line. The wireless communication device further includes a controller, coupled to the plurality of isolation buffers, that instructs the plurality of isolation buffers to enter a first mode wherein the isolation buffers attenuate spurious emissions from the plurality of active circuits that may otherwise reach the test data line. The controller also instructs a selected sensing circuit to enter a second mode in which the selected sensing circuit provides the test information to the isolation buffer coupled thereto which supplies the test information to the test data line.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 1B shows a more detailed diagram of a representative stage or active circuit of the disclosed wireless communication device.

DETAILED DESCRIPTION

Figure 1A:
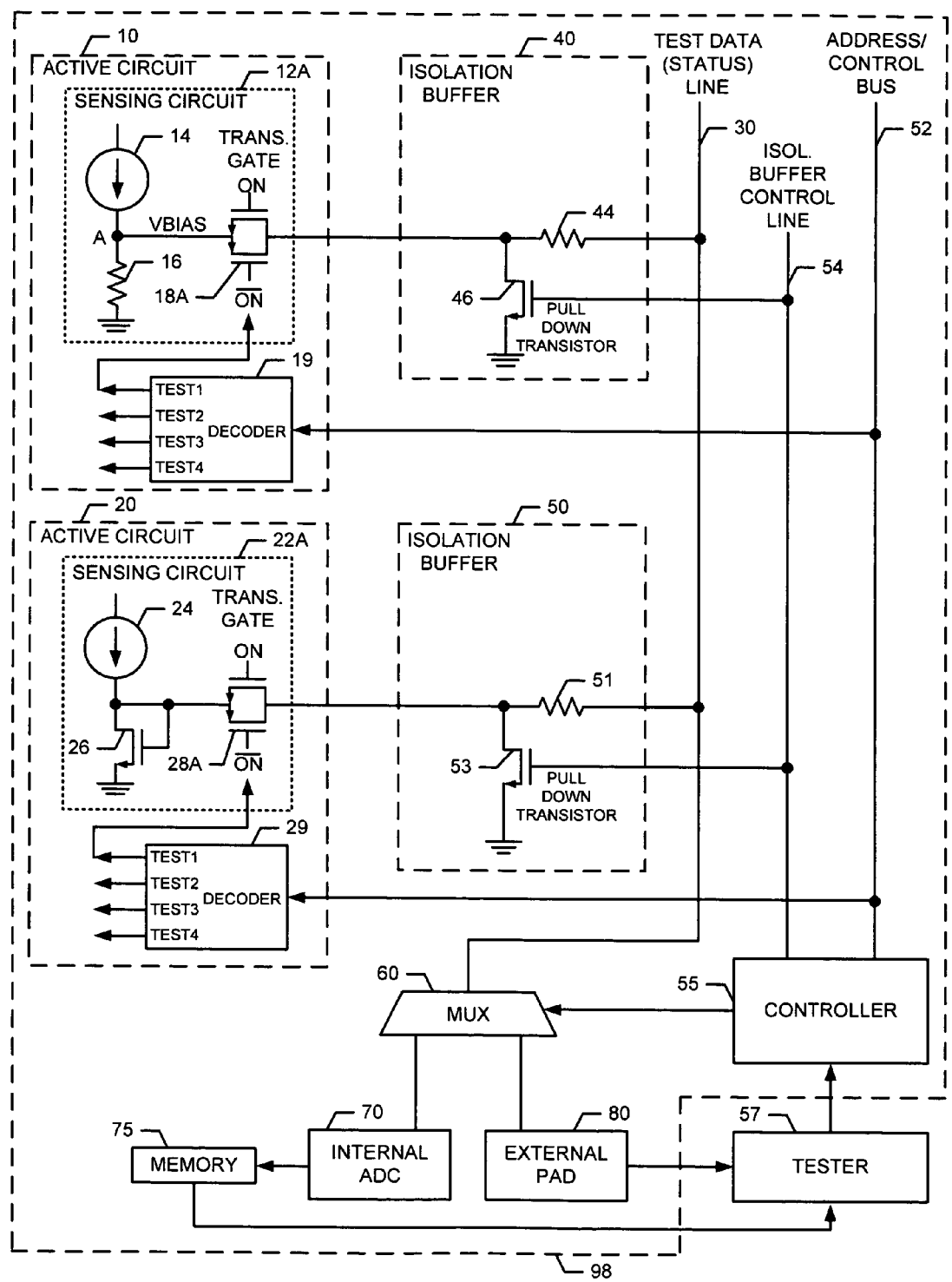
FIG. 1A shows a block diagram of two representative stages or active circuits of the disclosed wireless communication device.

FIG. 1A is a block diagram showing two representative stages of the disclosed communication device. More particularly, FIG. 1A shows these two representative stages as active circuits 10 and 20. In actual practice, active circuits 10 and 20 may be any stages of the communication device such as a low noise amplifier (LNA), programmable gain amplifier, analog to digital converter (ADC), digital signal processor, oscillator, phase detector, charge pump, voltage controlled oscillator (VCO), divider, digital to analog converter (DAC), other audio frequency or radio frequency amplifiers, other receiver stages, other transmitter stages, and baseband circuitry, for example.

Each active circuit or stage includes a sensing circuit which senses a particular parameter to be measured in that active circuit or stage. For example, active circuit 10 includes a sensing circuit 12A which measures a voltage, VBIAS, at a node A within active circuit 10. Sensing circuit 12A sends the sensed voltage, VBIAS, to a test data line 30 coupled thereto via an isolation buffer 40 as described in more detail below. Sensing circuit 12A, by way of example, may include a current source 14 coupled by a resistor 16 to ground. The junction between current source 14 and resistor 16 is defined as node A. Sensing circuit 12A includes a transmission gate 18A that couples node A to test data line 30 via isolation buffer 40. In normal operation the control signals, ON and /ON, cause transmission gate 18A to exhibit a high impedance state. However, during a test mode in which test information, namely the value of VBIAS, is transmitted to test data line 30, the ON and /ON signals supplied to the particular active circuit under test cause transmission gate 18A to exhibit a low impedance state. This action couples sensing circuit 12A to isolation buffer 40 thus helping to form a low impedance path to test data line 30 during test mode. However, transmission gates in other active circuits such as active circuit 20, remain in a high impedance state while active circuit 10 is being tested.

As seen in FIG. 1A, isolation buffer 40 is coupled between sensing circuit 12A of active circuit 10 and test data line 30. Isolation buffer 40 includes a resistor 44 coupled between the input and output of isolation buffer 40. A pull-down transistor 46 couples between the input of isolation buffer 40 and ground. Transistor 46 is switched on during normal operation to effectively short spurious high frequency radio energy from active circuit or stage 10 to ground. However, during test mode, transistor 46 is opened to provide the VBIAS signal from sensing circuit 12A with a low impedance path through resistor 44 to test data line 30. In one embodiment, 2 inverters (not shown) can be placed in the gate line of transistor 46 to reduce spurious emissions. The above incorporated U.S patent application Ser. No. 09/686,072, filed Oct. 11, 2000 by Welland et al., entitled "Method and Apparatus for Reducing Interference" teaches the use of inverters to reduce spurious emissions.

The communication device may include several active circuits each of which may be equipped with one or more sensing circuits to sense test information and report the sensed test information over test data line 30. In one embodiment, active circuit 10 includes more than one sensing circuit, for example, sensing circuits 12A, 12B, 12C and 12D, of which sensing circuit 12A is illustrated in FIG. 1A. Each of sensing circuits 12A ,12B, 12C and 12D may perform different tests on active circuit 10 when so instructed. Sensing circuit 12A performs TEST1; sensing circuit 12B performs TEST2; sensing circuit 12C performs TEST3 and sensing circuit 12D performs TEST 4 when selected. Another active circuit is shown in FIG. 1A as active circuit 20. Each active circuit is equipped with a respective decoder, such as decoders 19 and 29 for example, so that each active circuit can effectively know when it is being instructed to conduct a test and report back test information over test data line 30.

Active circuit 20 includes a sensing circuit 22A which is similar to sensing circuit 12A of active circuit 10. Active circuit 20 includes a current source 24 coupled to ground by a transistor 26. Active circuit 20 further includes a transmission gate 28A coupling the gate to source voltage of transistor 26 to an isolation buffer 50 that exhibits the same topology as isolation buffer 40.

In a manner similar to active circuit 10, active circuit 20 is coupled by isolation buffer 50 to test data line 30. Isolation buffer 50 includes a resistor 51 and a pull-down transistor 53 configured as shown. Active circuit 20, as well as active circuit 10, are both coupled to an address/control bus 52 as seen in FIG. 1A. Sensing circuit 22A of active circuit 20 and isolation buffer 50 are controlled in a manner similar to that of active circuit 10 as discussed in more detail below. Isolation buffers 40 and 50 are coupled to an isolation buffer control line 54 so that they may be controlled in the manner discussed below.

FIG. 1B is a more detailed diagram of representative active circuit 10 which includes sensing circuits 12A ,12B, 12C and 12D which respectively can conduct TEST1, TEST2, TEST3 and TEST4 when so instructed. Sensing circuits 12A ,12B, 12C and 12D includes transmission gates 18A, 18B, 18C and 18D which can transmit respective sensed values to test data (status) line 30 when so instructed.

Returning to FIG. 1A, the communication device includes a controller 55 that selects a particular active circuit to test and the particular test to conduct on the selected active circuit. In one embodiment, the selection of the particular active circuit for testing is performed by addressing the selected active circuit in the following manner. Controller 55 outputs an address/control signal on address/control bus 52, the low order bits (0, 1) of which indicate which of 4 tests to conduct, the high order bits (2, 3) of which indicate which of 4 active circuits to be tested. In this particular embodiment, an address/control signal of "1111" is reserved for normal operational mode as explained below. In another embodiment, the address/control signal "0000" or other digital word may be used to instruct the active circuits to operate in normal mode, as opposed to test mode. It should be understood that a greater or lesser number of bits may be employed depending on the number of active circuits to be tested and the number of different tests to be performed. The example given below is representative of many different addressing approaches that may be employed to select a particular active circuit for testing and the test to be conducted on the selected active circuit. Table 1 below shows one such representative arrangement of address/control bus 52:

TABLE 1

| SELECT ACTIVE CIRCUIT | | SELECT TEST (SENSING CIRCUIT) | | |
|---|---|---|---|---|
| BIT 3 | BIT 2 | BIT 1 | BIT 0 | |
| 0 | 0 | 0 | 0 | ACTIVE CIRCUIT 10, TEST 1 (SENSING CKT 12A) |
| 0 | 0 | 0 | 1 | ACTIVE CIRCUIT 10, TEST 2 (SENSING CKT 12B) |
| 0 | 0 | 1 | 0 | ACTIVE CIRCUIT 10, TEST 3 (SENSING CKT 12C) |
| 0 | 0 | 1 | 1 | ACTIVE CIRCUIT 10, TEST 4 (SENSING CKT 12D) |
| 0 | 1 | 0 | 0 | ACTIVE CIRCUIT 20, TEST 1 (SENSING CKT 22A) |
| 0 | 1 | 0 | 1 | ACTIVE CIRCUIT 20, TEST 2 (SENSING CKT 22B) |
| 0 | 1 | 1 | 0 | ACTIVE CIRCUIT 20, TEST 3 (SENSING CKT 22C) |
| 0 | 1 | 1 | 1 | ACTIVE CIRCUIT 20, TEST 4 (SENSING CKT 22D) |
| 1 | 0 | 0 | 0 | ACTIVE CKT M, TEST 1 (SENSING CKT M1) |
| 1 | 0 | 0 | 1 | ACTIVE CKT M, TEST 2 (SENSING CKT M2) |
| 1 | 0 | 1 | 0 | ACTIVE CKT M, TEST 3 (SENSING CKT M3) |
| 1 | 0 | 1 | 1 | ACTIVE CKT M, TEST 4 (SENSING CKT M4) |
| 1 | 1 | 0 | 0 | ACTIVE CKT N, TEST 1 (SENSING CKT N1) |
| 1 | 1 | 0 | 1 | ACTIVE CKT N, TEST 2 (SENSING CKT N2) |
| 1 | 1 | 1 | 0 | ACTIVE CKT N, TEST 3 (SENSING CKT N3) |
| 1 | 1 | 1 | 1 | NORMAL MODE |

Each active circuit, such as active circuits 10 and 20, includes a decoder such as decoders 19 and 29, that decodes the digital word on address/control bus 52 so that a particular sensing circuit is activated when it is being addressed or selected for test as per Table 1 above. This representative addressing arrangement will be discussed in more detail below in the description of test mode. Other signalling arrangements may also be employed as well to select a particular active circuit and then to instruct the selected active circuit regarding which test or tests to conduct using the address/control bus. For example, a one-hot encoding scheme may be employed to select a particular active circuit for testing and an address/control bus, common to all active circuits, to identify which test within the selected active circuit is to be performed through activating the appropriate sensing circuit.

In the embodiment shown in FIG. 1A, controller 55, at the direction of a tester 57 coupled thereto, instructs sensing circuits 12A and 22A, as well as isolation buffers 40 and 50 when to operate in normal operational mode or test mode. To operate in normal mode, controller 55 sends a control signal, for example "1111" as seen in Table 1, to sensing circuits 12A and 22A, via address/control bus 52, to instruct transmission gates 18A and 28A to open and exhibit a high impedance state. It can be more generally stated that during normal mode, controller 55 sends control signals to all sensing circuits instructing the respective transmission gates therein to open. To operate in normal mode, controller 55 also sends a buffer control signal, via buffer control line 54 to isolation buffer 40 and isolation buffer 50 to instruct pull-down transistors 46 and 53 to close. Thus, in the normal mode of operation, while all transmission gates are open to provide a high impedance path to respective sensing circuits, all pull-down isolation transistors on common test data line 30 are closed to effectively shunt to ground any high frequency spurious signals that might otherwise escape from an active circuit to the test data line during the normal mode of operation. This combined action results in a high level of isolation between active circuit 10 and active circuit 20. But for this action, it is possible that test data line 30 might otherwise convey high frequency spurious signals from active circuit to active circuit within the communication device. In one embodiment, during the normal mode of operation, controller 55 sends a control signal, for example a logic high, on buffer control line 54 instructing all pull-down transistors, such as pull-down transistors 46 and 53, to close. Thus, during normal mode, all isolation buffers 40, 50, etc, effectively short potentially spurious RF energy to ground via pull-down action.

However, to operate in test mode, controller 55 sends a control signal, for example a logic low, on buffer control line 54 instructing all pull-down transistors, such as pull-down transistors 46 and 53, to open. To operate intest mode, controller 55 also opens all transmission gates in respective sensing circuits, except for the sensing circuit in the active circuit to be tested. To achieve this, in one embodiment, controller 55 transmits an address/control signal on address/control bus 52 that is addressed to the particular sensing circuit that is selected to conduct a test. The particular sensing circuit thus addressed closes its transmission gate to provide a low impedance path via an isolation buffer, such as buffer 40 or 50, to test data line 30. All other sensing circuits not currently conducting a test maintain their transmission gates at a high impedance state while the test is conducted by the particular selected sensing circuit performing the test. The signal sensed during test mode may be a low frequency analog signal such as a bias voltage or bias current in one embodiment.

For example purposes, assume that tester 57 instructs controller 55 to conduct a TEST2 on active circuit 10 (i.e. activate sensing circuit 12B). To conduct such a test, controller 55 switches the communication device of FIG. 1A from normal mode to test mode. To achieve this change to test mode, controller 55 places a logic low buffer control signal on isolation buffer control line 54 to release the pull-down transistors such as transistors 46 and 53 in all of the isolation buffers, such as buffers 40 and 50, for example. After releasing the pull-down transistors, controller 55 asserts an address/control digital signal, 0001 on address/control bus 52. Table 1 shows this address/control digital signal as corresponding to a TEST 2 of active circuit 10. Decoder 19 of active circuit 10 receives and decodes the upper 2 bits "00" of the address/control signal which it recognizes as its own unique address code "00". Thus, decoder 19 is apprised that the following two lower bits, "01", identify which particular test sensing circuit of 12A through 12D is to be activated. Decoder 19 receives and decodes the lower 2 bits "01" which correspond to a TEST 2. Upon receiving this address/control signal, sensing circuit 12B closes its transmission gate 18B and conducts the specified test, namely TEST 2, for example a voltage or current level measurement, on active circuit 10. To close its transmission gate 18B, decoder circuit 19 supplies appropriate ON and $\overline{ON}$ signals on 11B to transmission gate 18B in response to decoder 19 receiving its address from address/control bus 52. The transmission gates of all other sensing circuits within active circuit 10 such as 12A, 12C, and 12D, remain open, as well as any other sensing circuits connected to test data line 30 such as sensing circuit 22 during the test in this particular embodiment. Since all pull down transistors are now switched off and transmission gate 18B of sensing circuit 12B is closed, a low impedance path exists between sensing circuit 12B and test data line 30 over which test information, namely test results, can be measured. Test information may be a representation of a voltage level, a current level or other parameter measured by a sensing circuit. In other embodiments, enabling a specific test can be used to influence the voltage or current level of an active circuit by providing a low impedance path between the tester 57 and a specific node in an active circuit such as node A of sensing circuit 12A. This can allow the tester 57 to drive a voltage or current into the active circuit through test data line 30 in order to influence the behaviour of an active circuit for test or other experimental purposes.

A multiplexer (MUX) 60 is coupled to test data line 30 so that the test information on test data line 30 can be directed either to an internal analog to digital converter (ADC) 70 or to an external test port or pad 80 as specified by controller 55. When controller 55 instructs MUX 60 to couple test data line 30 to internal ADC 70, then ADC samples the analog test information. Internal collecting and processing of the sampled test information may be performed by other internal circuitry (not shown) coupled to ADC 70. A memory 75 is coupled to internal ADC 70 to store sampled test information for later use. However, when controller 55 instructs MUX 60 to couple test data line 30 to external port or pad 80, then the external tester 57 coupled to pad 80 may address or scan the various active circuits or stages of the communication device and collect test information therefrom. Tester 57 can instruct controller 55 to address any particular active circuit and further instruct the active circuit thus addressed regarding which particular test to conduct via the appropriate sensing circuit. Thus in one embodiment, in test mode, low frequency analog signals such as sensed bias voltage or other sensed circuit parameters such as sensed current may pass freely from a sensing circuit such as sensing circuit 22 to the test data line 30. The structures of FIG. 1A within dashed line 98 may be fabricated in an integrated circuit if desired. In another embodiment, test data line 30 may include multiple lines so that multiple tests can be conducted in parallel within either the same active circuit, or across multiple active circuits at the same time.

Figure 2:
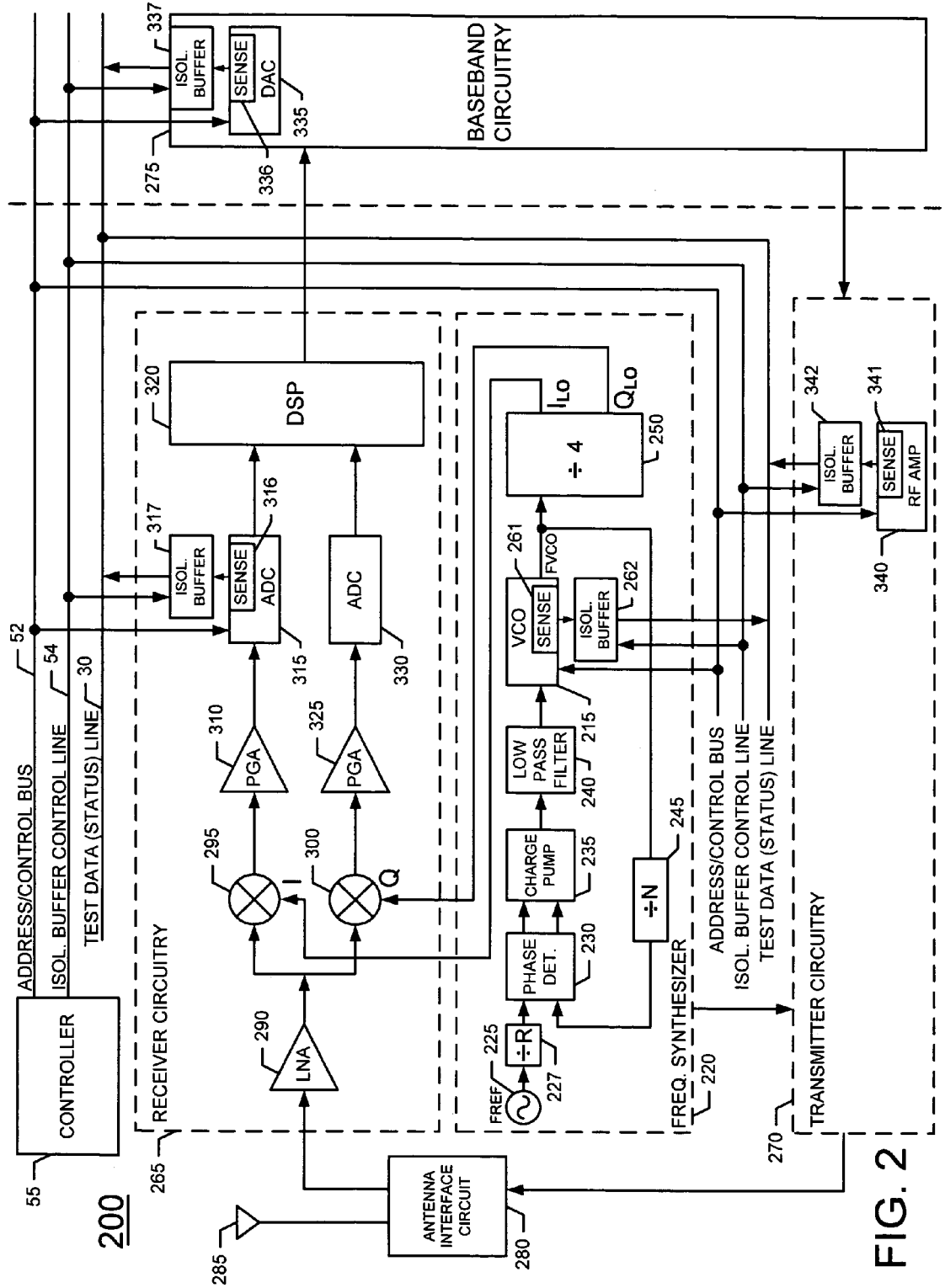
FIG. 2 is a more detailed block diagram of the disclosed wireless communication device.

FIG. 2 is a block diagram showing sensing circuits in representative active circuits or stages together with associated isolation buffers in a communication device 200. An isolation buffer and sensing circuit may be associated with virtually any of the active circuits or stages of a communication device such as communication device 200 to enable the sensing of parameters of those active circuits. One example of such an active circuit is the voltage controlled oscillator (VCO) 215 that is situated in frequency synthesizer 220 of FIG. 2. Frequency synthesizer 220 includes a reference frequency oscillator 225, a pre-divider 227 (divide by R), a phase detector 230, a charge pump 235, a low pass filter 240 and a divide by N divider circuit 245, all coupled together as shown in FIG. 2. VCO 215 generates a phase locked loop (PLL) output signal FVCO that exhibits a frequency N times the frequency of reference oscillator 225 signal FREF divided by R. A divide by 4 quadrature divider circuit 250 processes the FVCO signal into an in-phase signal, $I_{LO}$, and a quadrature signal, $Q_{LO}$, that are supplied to receiver circuitry 265 as shown.

Focussing now for example purposes on VCO 215, it is noted that VCO 215 is an example of an active circuit or stage in communication device 200 that includes a sensing circuit 261 and an associated isolation buffer 262. Each active circuit includes a decoder, such as decoder 19 as described above, that is not shown in FIG. 2 for illustrative convenience. Sensing circuit 261 may be configured similarly to sensing circuits 12A or 22A of FIG. 1A. Isolation buffer 262 may be configured similarly to isolation buffers 40 or 50, also of FIG. 1A. Sensing circuit 261 and associated isolation buffer 262 perform in the same manner discussed above with respect to FIG. 1A, namely in a normal mode and a test mode. Each active circuit, such as VCO 215, includes a respective sensing circuit for each test to be performed on that active circuit. Through address/control bus 52, controller 55 instructs all sensing circuits including 261 and all isolation buffers including 262 how to be configured when operating in normal mode and how to be configured when to operating in a test mode. When operating in normal mode, the transmission gate in sensing circuit 261 exhibits a high impedance state as do all other sensing circuit transmission gates connected to test data line 30. In the same normal mode, the pull-down transistors in isolation buffer 262 and all other isolation buffers connected to test data line 30 in communication device 200 are closed. This provides an effective short to ground of the test data line 30 to prevent unwanted signals such as spurious high radio frequency signals from coupling from active circuit block to active circuit block through the test data line. However, when controller 55 initiates a test mode and for example selects a test associated with sensing circuit 261, the transmission gate in sensing circuit 261 switches to a low impedance state and the pull-down transistor in isolation buffers 262 and all other isolation buffers connected to test data line 30 open to provide a low impedance signal path for the sensed signal or parameter to travel from the sensing circuit 261 to the test data line 30. During this example test mode, all sensing circuits except the selected sensing circuit 261 connected to test data line 30, are not activated and have their associated transmission gates switched into an open high-impedance state to avoid interfering with the signal currently being tested on test data line 30.

While not separately illustrated in communication device 200 of FIG. 2, communication device 200 includes the same tester 57, multiplexer 60, internal ADC 70, memory 75 and external pad 80 as illustrated in FIG. 1A. Sensing circuits and isolation buffers may be associated with other active circuits, stages, or blocks of communication device 200 other than frequency synthesizer 220, such as receiver circuitry 265, transmitter circuitry 270 and baseband circuitry 275.

An antenna interface circuit 280 couples an antenna 285 to receiver circuitry 265 and transmitter circuitry 270. The antenna interface circuit 280 couples to a low noise amplifier (LNA) 290 in receiver circuitry 265. The output of LNA 290 couples to an in-phase mixer 295 and a quadrature mixer 300 as shown. The in-phase output, $I_{LO}$, and quadrature output, $Q_{LO}$, of divider 250 are coupled to the I and Q local oscillator inputs of mixers 295 and 300, respectively. A programmable gain amplifier (PGA) 310 couples the output of mixer 295 to an analog to digital converter (ADC) 315. ADC 315 digitizes the amplified I (in-phase) signal from mixer 295 and supplies the resultant digitized signal to a digital signal processor (DSP) 320. Another programmable gain amplifier (PGA) 325 couples the output of mixer 300 to an analog to digital converter (ADC) 330. ADC 330 digitizes the amplified Q (quadrature) signal from mixer 300 and supplies the resultant digitized signal to DSP 320. DSP 320 performs signal processing operations on the digitized I and Q signals and transmits the result signal to baseband circuitry 275. Representative operations performed by DSP 320 include digital down conversion to baseband, channel filtering and digital gain adjustments.

ADC 315 is an example of another active circuit or stage in communication device 200 that includes a sensing circuit 316. An associated isolation buffer 317 couples to sensing circuit 316 to provide sensed test information to test data line 30 as seen in FIG. 2. Digital to analog converter (DAC) 335 in baseband circuitry 275 is yet another example of an active circuit in communication device 200 that includes a sensing circuit 336. An isolation buffer 337 is coupled to sensing circuit 336 to provide sensed test information to test data line 30. RF amplifier 340 in transmitter circuitry 270 is still another representative example of an active circuit in communication device 200 that employs a sensing circuit 341 and a corresponding isolation buffer 342 to provide sensed test information to either an external or internal test apparatus via test data line 30.

While 4 examples are given above of active circuits in communication device 200 that contain a decoder, sensing circuits and respective isolation buffers, virtually any active circuit or stage in device 200 may contain these structures. In one embodiment, it is desirable that as many active circuits in communication device 200 as possible be outfitted with such sensing circuits and isolation buffers so that sensed information or test information may be collected from as many stages or blocks in device 200 as possible. Gathering of such test information by a tester 57 of FIG. 1A may be very helpful in the test and debug phase of communication device design. Tester 57 may poll, scan or effectively address all active circuits in communication device 200 that are equipped with a sensing circuit and associated isolation buffer as described above.

Figure 3:
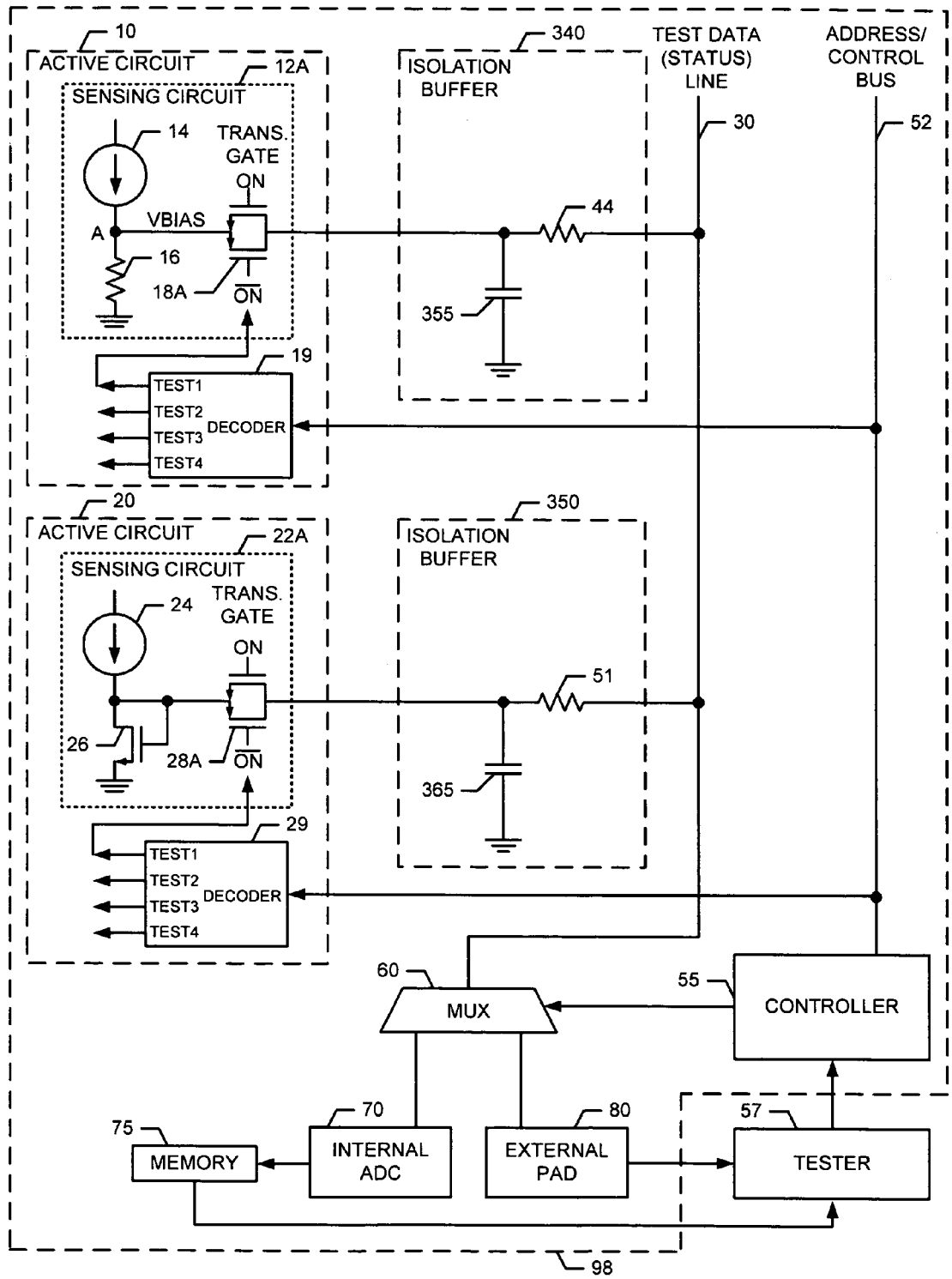
FIG. 3 is a block diagram of alternative representative isolation buffers of the disclosed wireless communication device.

FIG. 3 shows an alternative embodiment of the isolation buffer depicted in FIG. 1A. The portion of the communication device shown in FIG. 3 includes many elements in common with the communication device of FIG. 1A. Like numbers are used to indicate like elements when comparing the communication device of FIG. 3 with the communication device of FIG. 1A. Isolation buffer 340 of FIG. 3 is similar to isolation buffer 40 of FIG. 1A except that a capacitor 355 is substituted for pull-down transistor 46. Likewise, isolation buffer 350 of FIG. 3 is similar to isolation buffer 50 of FIG. 1A except that a capacitor 365 is substituted for pull-down transistor 53. Isolation buffer control line 54. is also removed in FIG. 3.

Sensing circuits 12A and 22A in FIG. 3 and their corresponding isolation buffers 340 and 350 may still be viewed as operating in a normal mode and a test mode. Sensing circuits 12A and 22A are configured such that their respective transmission gates 18A and 28A normally exhibit a high impedance state except when controller 55 addresses a particular sensing circuit and instructs the particular sensing circuit to switch to a test mode. When controller 55 so instructs a particular sensing circuit to enter test mode by sending that sensing circuit's address to the associated active circuit's decoder, then that sensing circuit's transmission gate switches to a low impedance state.

Assume for example that controller 55 wants to test active circuit 10 using sensing circuit 12A. Controller 55 sends the digital word corresponding to the address of active circuit 10, sensing circuit 12A to decoders 19 and 29. Decoder 19 decodes the digital word and, in response, switches the state of the ON and $\overline{ON}$ signals to cause transmission gate 18A to switch from a high impedance state to a low impedance state. Similarly, decoder 29 recognizes that sensing circuit 22 is not being addressed and so in response maintains transmission gate 28 in an open high-impedance state. Capacitor 355 and resistor 44 act together as a low pass filter which shunt high-frequency spurious signals to ground. In this test mode, low frequency analog test signals travel from sensing circuit 12A through transmission gate 18A and through isolation buffer 350 to test data line 30. Since isolation buffer 350 behaves as a low pass filter, any low frequency analog test signals pass through isolation buffer 350 with little attenuation. Isolation buffer 350 thus operates in a high isolation normal mode for spurious signals and a low impedance test mode for low frequency analog test signals. Isolation buffer 350 and sensing circuit 22A of active circuit 20 of FIG. 3 behave in a manner similar to isolation buffer 350 and sensing circuit 12A of active circuit 10.

Figure 4:
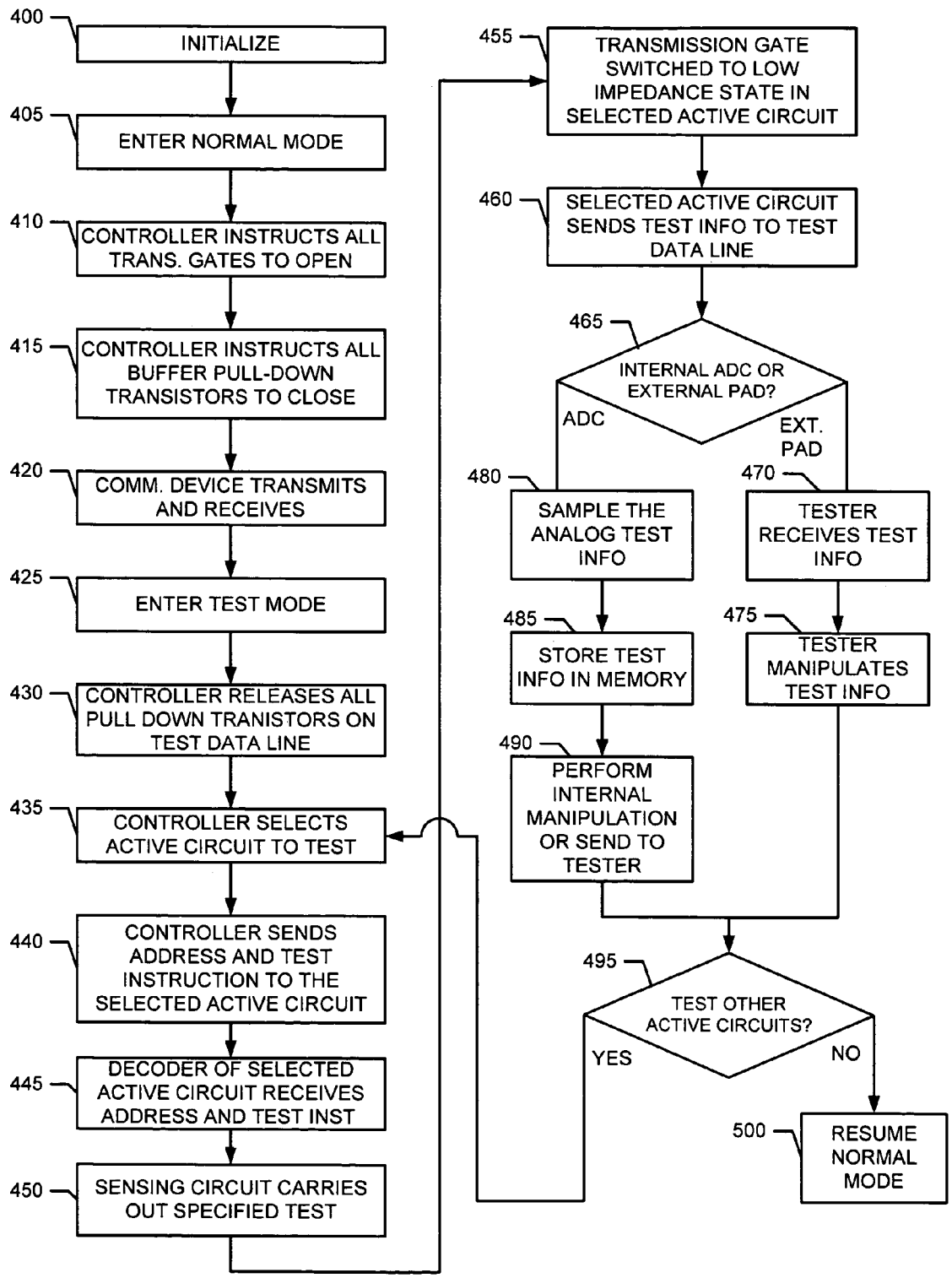
FIG. 4 is a flowchart that depicts the operation of the disclosed wireless communication device.

FIG. 4 is a flowchart that depicts the normal mode and test mode of communication device 200. Communication device 200 is initialized at block 400 and enters a normal mode of operation as per block 405. When operating in normal mode, controller 55 instructs the transmission gates in all sensing circuits to open as per block 410 and further instructs all isolation buffer pull-down transistors to close, as per block 415. Thus, in normal mode, spurious emissions are largely prevented from escaping a sensing circuit by the effective short to ground of the respective isolation buffer. The normal mode of communication device 200 refers to the operational mode wherein device 200 transmits and receives information, as per block 420.

At some point in the design or debug phase of a communication device, it may be desirable to test or sample selected low frequency analog signals in the respective active circuits of the device. To accomplish such testing, communication device 200 enters a test mode at the direction of controller 55 as per block 425. Tester 57 may instruct controller 55 to cause device 200 to enter test mode. To enter test mode, controller 55 first releases all pull-down transistors on test data line 30 by sending a logic low control signal on isolation buffer control line 54, as per block 430. In response to this control signal, the pull-down transistors open so that the isolation buffers, such as buffers 40 and 50 provide low impedances paths between their respective sensing circuits and test data line 30. Controller 55 then selects a particular active to circuit to test, as per block 435. Controller 55 sends the address of the selected active circuit along with a test instruction to the selected active circuit, as per block 440. The decoder of the selected active circuit receives and recognizes the address of the selected active circuit and further receives and recognizes the test instruction, as per block 445. The decoders of other active circuits receiving the address and test instruction take no action in response because the received address is not the address associated with any active circuit other than the selected one. Thus, the transmission gates of all sensing circuits within other active circuits remain open in a high-impedance state. The specific sensing circuit of the correctly addressed active circuit selected by the specified test instruction, as per block 450, is activated by the decoder of the selected active circuit to carry out the specified test. For example, the test may be to measure a voltage, a current or other parameter associated with the addressed circuit. The transmission gate of the selected sensing circuit of the selected active circuit, namely of the addressed active circuit, switches to a low impedance state, as per block 455. This provides a low impedance path to test data line 30. The selected active circuit now sends the results of the specified test, namely test information, to test data line 30, as per block 460.

As per decision block 465, multiplexer (MUX) 60 either supplies the test information, which may for instance be in the form of a voltage or current, to internal ADC 70 or external connecting port or pad 80. If controller 55 instructs MUX 60 to send the test information to external pad 80, then tester 57 receives the test information, as per block 470. Tester 57 then manipulates the test information as per block 475. If at decision block 465, controller 55 instructs MUX 60 to supply the test information to internal ADC 70, then ADC 70 samples the test information, as per block 480. Memory 75 then stores the sampled test information, as per block 485. Other circuitry (not shown) in the communication system of FIG. 1A may then manipulate the sampled test information, or send the sampled test information to tester 57, as per block 490. If controller 55 needs to test further active circuits in the communication system then, at decision block 495, process flow continues back to block 435 at which controller 55 selects another active circuit to address and test. However, if controller 55 currently does not need to test any additional active circuits, then process flow continues to block 500 at which normal mode is resumed.

In an alternative embodiment, test data line 30 may actually include multiple test data lines so that more than one test can be conducted in parallel at a particular time. In other words, multiple test data lines may be connected to different groups of sensing circuits, respectively. In this configuration, a respective test data line is coupled to and shared by each group of sensing circuits. Each group of sensing circuits may conduct a test at an addressed one of that group's sensing circuits while another group of sensing circuits is simultaneously conducting testing at an addressed one of its sensing circuits. This arrangement enables controller 55 to perform different tests at the same time, and for tester 57 or memory 75 to gather test information from across multiple tests in parallel. In one embodiment of a system employing multiple test data lines, each active circuit within a device such as communication device 200, may have access to a plurality of test data lines in the form of a test data bus. In this configuration, controller 55 can still select a specific active circuit to be tested using the high order bits of the address/control bus and use the lower order bits of the address/control bus to select a specific test mode for the selected active circuit. However, the decoder within the selected active circuit decodes the lower order bits on the address/control bus and selects a unique sense circuitry for each of the available test data lines in the test data bus to put test information on the test data bus. The test data bus may also be used in a bidirectional sense in certain test modes such that measurements may be made on one line with test information flowing from an active circuit toward MUX 60 and tester 57 for instance, while external test information such as a bias control voltage may be driven into an active circuit from the direction of MUX 60 such as from tester 57, or an internal DAC, not shown. Many different types of addressing schemes, test data line partitioning, and variations of test information flow and control are possible consistent with the teachings herein.

A wireless communication device is thus disclosed which provides for testing of the active circuits or stages of the device while reducing or containing spurious radiation that might otherwise emanate from such stages due to the testing circuitry.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a wireless communication device including a plurality of active circuits comprising: operating the device in a normal mode wherein a first switch in a sensing circuit of a particular active circuit opens to decouple the sensing circuit from a test data line and wherein a second switch in an isolation buffer that couples the sensing circuit to the test data line closes to effectively short spurious radiations from the active circuit to ground, the opening of the first switch and closing of the second switch being in response to a control signal on a control bus that selects the particular active circuit from the plurality of active circuits; and operating the device in a test mode wherein the first switch closes to couple the sensing circuit to the isolation buffer and wherein the second switch opens to allow a test signal to pass from the sensing circuit through the isolation buffer to the test data line, the closing of the first switch and opening of the second switch being in response to the control signal on the control bus that selects the particular active circuit from the plurality of active circuits.

2. The method of claim 1, further comprising sensing, by the sensing circuit, an operating parameter of the active circuit, and providing the operating parameter thus sensed in the test signal.

3. The method of claim 1, further comprising instructing, by a controller, the device to enter the normal mode.

4. The method of claim 1, further comprising instructing, by a controller, the device to enter the test mode.

5. The method of claim 1, further comprising actuating, by a controller, the second switch in the isolation buffer to close to conduct spurious emissions from the active circuit to ground when the active circuit enters the normal mode.

6. The method of claim 5, further comprising actuating, by the controller, the second switch to open to permit the test signal from the sensing circuit to flow through the isolation buffer to the test data line when the active circuit enters the test mode.

7. A wireless communication device comprising: a plurality of active circuits including a first active circuit having a first sensing circuit that senses an operational parameter of the first active circuit; a test data line; a first isolation buffer coupling the first sensing circuit to the test data line; a control bus coupled to the plurality of active circuits; and a controller, coupled to the control bus, the controller generating a control signal that selects the first active circuit from the plurality of active circuits and instructs the device to operate in a normal mode wherein a first switch in the first sensing circuit opens to decouple the first sensing circuit from the test data line and wherein a second switch in the first isolation buffer closes to effectively short spurious radiations from the first active circuit to ground, wherein the controller further instructs the device to operate in a test mode in which the first switch closes to couple the first sensing circuit to the first isolation buffer and in which the second switch opens to allow a test signal to pass from the first sensing circuit through the first isolation buffer to the test data line.

8. The wireless communication device of claim 7, wherein the plurality of active circuits includes a second active circuit including a second sensing circuit coupled by a second isolation buffer to the test data line, the controller being coupled to both the first active circuit and the second active circuit, wherein the controller instructs one of the first and second active circuits to enter the test mode thus designating a selected active circuit while a remaining one of the first and second active circuits remains in the normal mode.

9. The wireless communication device of claim 7, wherein the first active circuit is one of a transmitter active circuit, a receiver active circuit and a baseband active circuit.

* * * * *